2,705,961

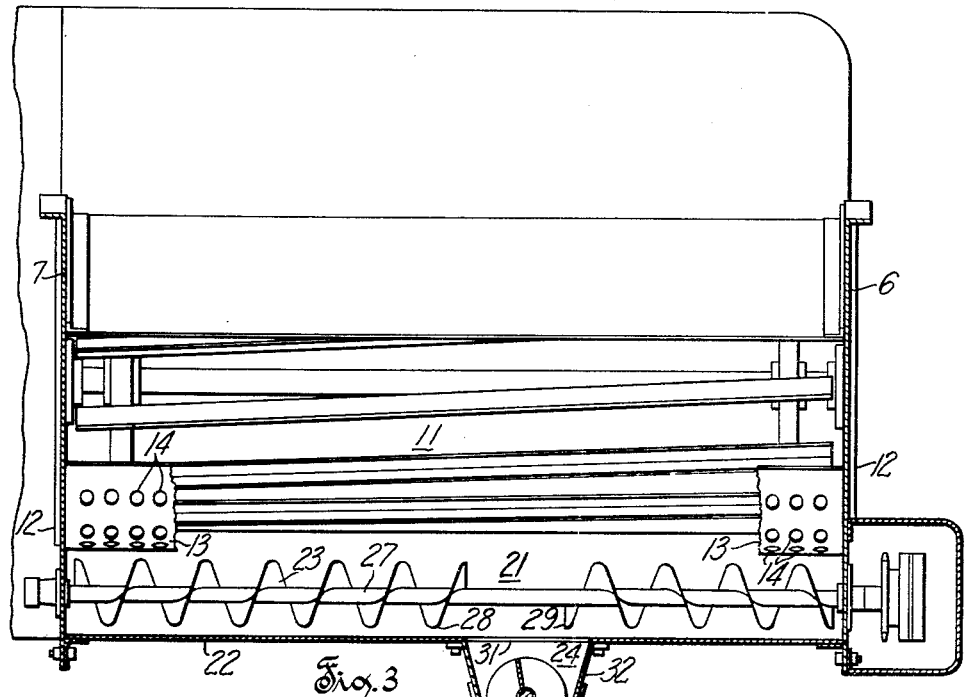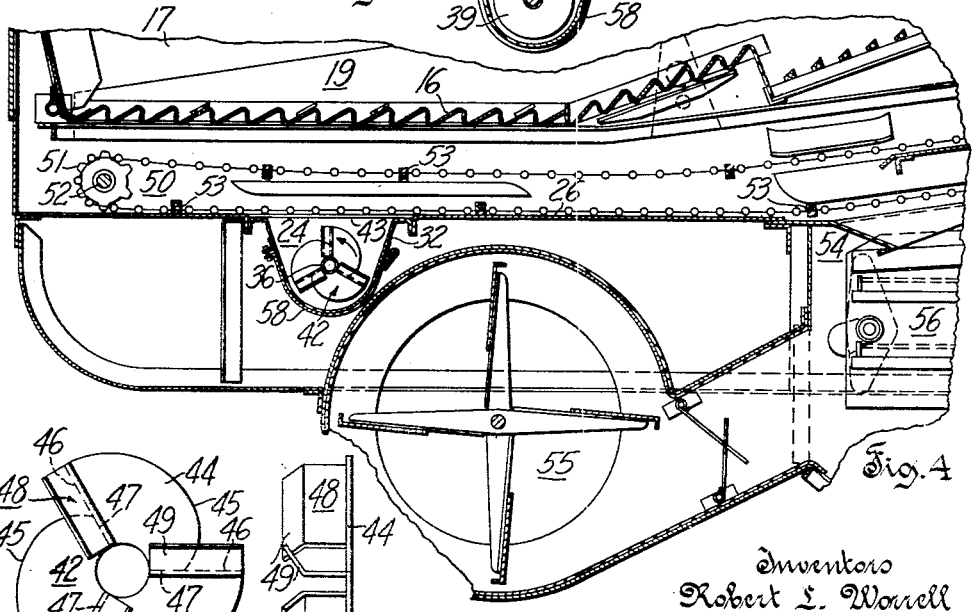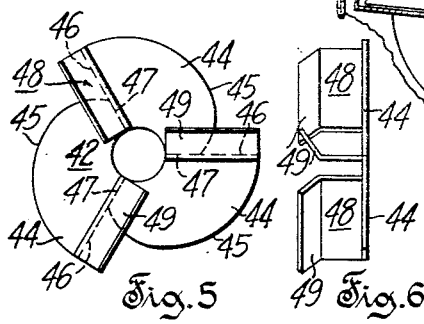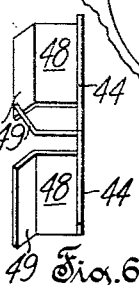

MATERIAL HANDLING SYSTEM FOR HARVESTERS

Robert L. Worrell and Charles E. Adams, La Porte, Ind., assignors to Allis-Chalmers Manufacturing Company, West Allis, Wis.

Application February 18, 1954, Serial No. 411,202

5 Claims. (Cl. 130—27)

This invention relates to harvesting machines and more particularly to machines having a threshing cylinder disposed between side walls and a concave plate coacting with the cylinder for threshing purposes and wherein the concave plate is provided with series of openings through which grain may pass, thereby providing some separation of the grain from the straw at the concave.

The principal object of this invention is the provision of an improved harvester having mechanism for handling material passing through openings in the concave plate.

In some harvesters as heretofore constructed, a grain drag floor and coacting grain drag conveyer have been extended to a point under a concave to catch and transport material passing through the concave to a cleaning shoe. This construction is not entirely satisfactory, particularly from the standpoint of manufacturing costs and space requirements. Moreover, such solution of the problem is entirely impractical for harvesters utilizing a cross separator type of construction such as is shown for instance, in the patent to Charley, U. S. 2,123,879, for Harvester-Thresher, issued July 19, 1938.

A further object of this invention is to provide a lightweight and simple mechanism for conveying material from beneath a concave plate to a grain drag floor positioned beneath a straw rack.

It is a further object of this invention to provide an improved system of the above mentioned character which lends itself to use in a harvester utilizing a straw rack which reciprocates in a direction transverse to the direction of travel of the harvester.

Another object of this invention is to provide mechanism in a harvester for conveying material separated from straw at the concave plate to a cleaning shoe without interfering with the functioning of a cross separator in the harvester. These and other objects of this invention will be apparent after a consideration of the following description and appended drawings in which:

Fig. 3 is a view taken on line III—III of Fig. 2 with some parts removed;

Fig. 4 is a view taken on line IV—IV of Fig. 2 with some parts removed;

Fig. 5 is an enlarged view of the slinger assembly shown in Fig. 4 with the central shaft removed; and Fig. 6 is a side elevation of the slinger assembly shown in Fig. 5.

Figure 1:
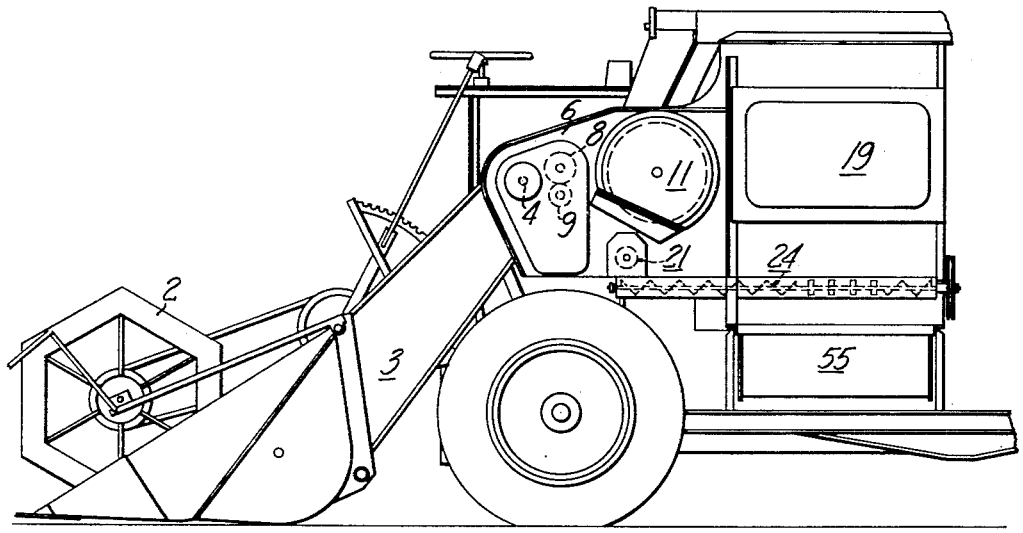
Fig. 1 is a side elevation view of a forward portion of a self-propelled combine harvester embodying the invention.
Figure 2:
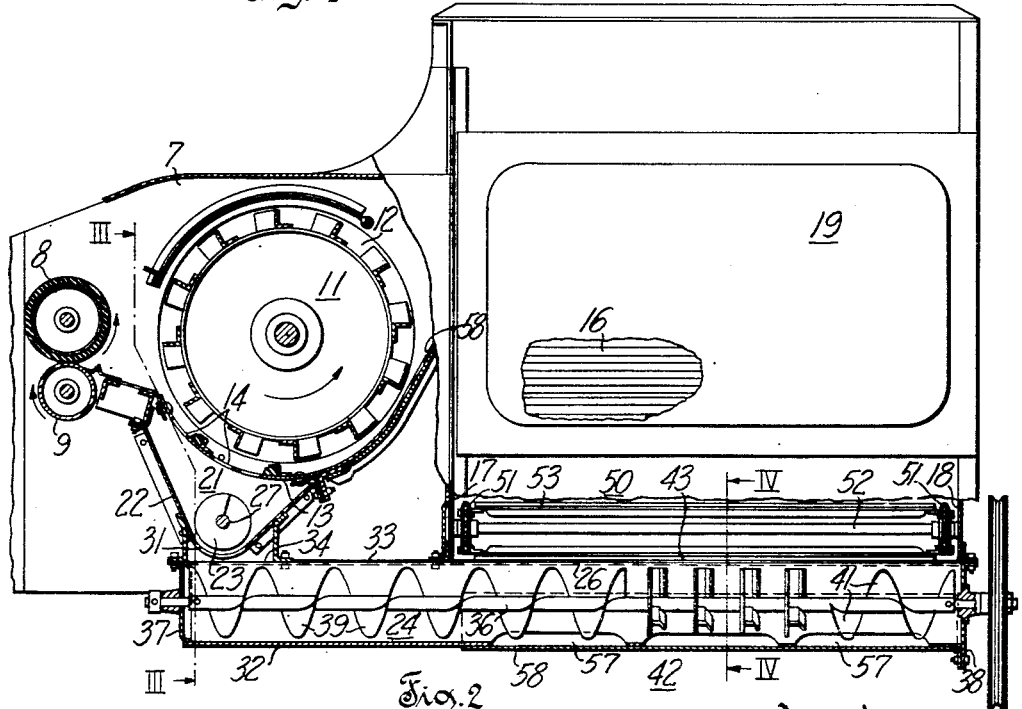
Fig. 2 is an enlarged view of a portion of the machine shown in Fig. 1 with some parts broken away.

Referring to Fig. 1 it is seen that a combine harvester has been provided, the front or forward end only of which is shown, including a header structure equipped with a rotatable reel 2 and a grain cutting and conveying mechanism indicated generally at 3. The header is pivotally mounted about an upper conveyor shaft 4 for up and down swinging motion. Conveyor shaft 4 is journaled in bearings (not shown) carried by longitudinally extending vertical side walls 6 and 7 of the harvester (Fig. 2). Adjacent to and rearwardly of shaft 4, a pair of coacting feed rolls 8 and 9 (Figs. 1 and 2) are journaled in longitudinally extending side walls 6 and 7 in receiving relation to cut grain delivered from a conveyor (not shown) having one end thereof operatively mounted about shaft 4. A transversely extending threshing cylinder 11 is rotatably mounted in bearings which are attached to side plates 12 carried by side walls 6 and 7. The normal direction of rotation of cylinder 11 is shown by an arrow in Fig. 2. Extending between side walls 6 and 7 in underlying coacting relation to threshing cylinder 11 is a concave plate 13 which is provided with series of openings 14 which are of sufficient size to permit kernels of the grain being threshed and some chaff to pass through while the remaining grain, chaff and straw is moved over the concave plate by the action of cylinder 11 onto the receiving end of transversely extending straw rack 16 (Figs. 2 and 4) reciprocally mounted between transversely extending side walls 17 and 18 of separator housing 19.

Underlying concave plate 13 (Fig. 2) and extending between side walls 6 and 7 is a collecting conveyor 21 of the auger type including a trough-like guide 22 attached at its tranverse ends to side walls 6 and 7. A transversely extending auger 23 is operatively mounted in a lower portion of trough 22 for moving threshed material dropping through apertures 14 in concave plate 13 transversely to a point of discharge into longitudinally disposed transfer conveyor 24 which in turn delivers the threshed material onto a grain drag floor 26 (Fig. 4) which extends transversely in underlying relation to straw rack 16.

Auger 23 includes a rotatable shaft 27 journaled in bearings carried by side walls 6 and 7. Attached to shaft 27 (Fig. 3) are helical flightings 28 and 29 which are pitched in opposite directions for moving threshed material to an intermediate portion of trough 22 at which portion trough 22 is provided with an opening 31 (Figs. 2 and 3) communicating with the material receiving end of longitudinally disposed transfer auger conveyor 24.

Conveyor assembly 24 includes a generally trough shaped structure 32 attached to an underside portion of grain drag floor 26 and a forward extension 33 thereof. The forward end of trough 32 is provided with an upper opening 34 positioned in underlying communicating relation to opening 31 in trough 22. A central shaft 36 is journaled in bearings carried by longitudinal end portions 37 and 38 which are attached to trough 32. Attached to central shaft 36 are helical flightings 39 and 41 which are pitched in opposite directions for moving material toward an intermediate portion of shaft 36 which is provided with a series of paddle or slinger assemblies 42 underlying an opening 43 in grain drag floor 26 (Figs. 2 and 4).

Each slinger assembly 42 consists of three radially extending disk segments 44 mounted about shaft 36. All adjacent segments are equally spaced apart. Each of the segments 44 (Figs. 5 and 6) are provided with an arcuate outer or peripheral portion 45 bounded by a leading radial surface 46 and a lagging radial surface 47 approximately one-half the size of leading radial surface 46. A longitudinally and radially extending slinger member 48 is attached at one side to each radial surface 46 and to each lagging surface 47 of the segment adjoining. Each slinger member 48 is provided with a turned up portion 49 which is on the side of the slinger member opposite to its attachment with segments 44. Segments 44, slinger members 48 and turned over portions 49 are joined at their inner portions to shaft 36 as by welding.

Each of these segments 44 with its attached slinger member 48 and its turned up portion 49 forming a scoop for confining, moving and slinging material through opening 43 (Figs. 2 and 4) as shaft 36 is rotated. As shaft 36 is rotated, material in trough 32 is picked up by this aforementioned scoop and as a result of centrifugal force is thrown off the outer end of slinger members 48 through opening 43 to land on grain drag floor 26. The lagging surface of segments 44 in their attachment with slinger members 48 provide a reinforcing for same making a generally solid structure about shaft 36.

A grain drag conveyer 50 is drivenly mounted at one end about a pair of sprockets 51 attached to a shaft 52 journaled in side walls of separator housing 19. Grain drag conveyer 50 is provided with a plurality of drag members 53 which contact floor 26 and move material thereover and into cleaning shoe 54 (Figs. 1 and 4) which underlies straw rack 16 and drag conveyer 50. Cleaning shoe 54 is of conventional design including a blower 55 and cleaning screens 56 and which shoe separates grain from chaff.

Trough 32 is provided with cleanout opening 57 which are covered by removable cover member 58 carried by trough 32.

The operation of the harvester is as follows: Grain is cut and elevated to feed rolls 8 and 9 by cutting and conveying mechanism 3. Feed rolls 8 and 9 revolve in the direction shown in Fig. 2 and deliver the cut grain into contact with threshing cylinder 11 which moves the cut grain over concave plate 13. The straw and some grain is impelled by the threshing cylinder over the concave plate 13 and extension 58 (Fig. 2) onto the top side of the material receiving end of straw rack 16 positioned within transversely extending housing 19. Straw rack 16 is reciprocatingly mounted between side walls 17 and 18 and moves straw transversely toward the discharge end (not shown) thereof. Grain and chaff drop through rack 16 as it is reciprocated and comes to rest on grain drag floor 26.

Some grain and chaff which passed through opening 14 in concave plate 13 drop down into the bottom of trough or chute member 22 from whence the grain and chaff are moved transversely by flightings 28 and 29 until the grain and chaff drop through openings 31 and 34 (Fig. 2) at the receiving end of transfer conveyer 24. The grain and chaf are then moved longitudinally by flighting 39 until the grain and chaff are positioned beneath opening 43 in floor 26. At this position slinger assemblies 42 contact the grain and chaff and sling it up through opening 43 onto floor 26. Some grain and chaff in being moved by flighting 39 and slingers 42 may have been moved rearwardly past slingers 42. This grain and chaff will be returned to slingers 42 by flighting 41.

The material on grain drag floor 26 is moved by drag members 53 transversely over floor 26 until the material is deposited onto cleaning shoe 54 there to be acted upon in a conventional manner not forming any part of this invention.

The power means for activating the various mechanisms previously described are not herein described nor shown as any conventional means can be used to drive these mechanisms.

It is to be understood that it is not desired to limit the invention to the particular features and details described hereinabove and that the invention is to be considered as including such other forms and modifications as are fairly within the scope of the appended claims.

It is claimed and desired to secure by Letters Patent:

1. In a harvester having a transversely extending threshing cylinder, a concave plate underlying said threshing cylinder and being provided with holes for the passage of material, a transversely extending straw rack positioned in material receiving relation to said threshing cylinder, a transversely extending collecting conveyer underlying said concave plate in receiving relation to the material passing through said plate, a transversely extending grain floor underlying said straw rack and positioned in receiving relation to material passing through said straw rack, and a longitudinally extending transfer conveyer underlying said collecting conveyer in material receiving relation thereto and underlying said grain floor in material discharging relation thereto.

2. In a harvester having a threshing cylinder coacting with an underlying concave having perforations therein permitting threshed material to pass through, a separating mechanism mounted in threshed material receiving relation to said cylinder and including a straw rack positioned above a cleaning shoe, a grain drag floor having a conveyer operatively mounted in relation thereto for delivering material passing through said straw rack to said cleaning shoe, the improvement comprising a chute member positioned beneath said concave and operative to confine material passing through said concave in a lower portion of said chute, a collecting conveying mechanism positioned in said lower portion of said chute and operative to move material from the ends thereof toward the middle, a transfer conveyer underlying said collecting conveying mechanism, said chute providing an aperture in said midportion communicating with the receiving end of said underlying conveyer, said underlying conveyer being so positioned as to have its delivery portion mounted beneath said grain drag floor, said grain drag floor having an opening overlying the delivery portion of said underlying conveyer, and means mounted on the delivery portion of said underlying conveyer for elevating material moved by said underlying conveyer to said grain drag floor.

3. In a harvester having a threshing cylinder coacting with an underlying concave having perforations therein permitting threshed material to pass through, a separating mechanism mounted in threshed material receiving relation to said cylinder and including a straw rack positioned above a cleaning shoe, a grain drag floor having a conveyer operatively mounted in relation thereto for delivering material passing through said straw rack to said cleaning shoe, the improvement comprising a chute member positioned beneath said concave and operative to confine material passing through said concave in a lower portion of said chute, a collecting conveying mechanism positioned in the lower portion of said chute and including a rotatable shaft having opposed auger flighting and being operative to move material from the ends thereof to the midportion thereof, a transfer conveyor underlying said collecting conveying mechanism, said chute providing an aperture in said midportion communicating with the receiving end of said underlying conveyer, said underlying conveyer being so positioned as to have its delivery portion mounted beneath said grain drag floor, said grain drag floor having an opening overlying the delivery end of said underlying conveyer, means mounted on the delivery end of said underlying conveyer for elevating material moved by said underlying conveyer to said grain drag floor, said means including slinger members mounted on a shaft of said conveyer for movement in vertical planes.

4. In a harvester having a threshing cylinder coacting with an underlying concave having perforations therein permitting threshed material to pass through, a separating mechanism mounted in threshed material receiving relation to said cylinder and including a straw rack positioned above a cleaning shoe, a grain drag floor having a conveyer operatively mounted in relation thereto for delivering material passing through said straw rack to said cleaning shoe, the improvement comprising a chute member positioned beneath said concave and operative to confine material passing through said concave in a lower portion of said chute, a collecting conveying mechanism positioned in the lower portion of said chute and operative to move material horizontally from the ends thereof toward the middle, a transfer conveyer underlying said collecting conveying mechanism, said chute having an aperture in said midportion communicating with the receiving end of said underlying conveyer, a rotatable shaft extending the length of said conveying mechanism and having oppositely pitched auger flighting thereon extending inwardly from the ends of said shaft, said flighting coacting with said chute for moving material into said aperture, said underlying conveyer being so positioned as to have its delivery portion mounted beneath said grain drag floor, said grain drag floor providing an opening overlying the delivery portion of said underlying conveyer, a centrally disposed shaft extending the length of said underlying conveyer, said shaft being provided with oppositely pitched flighting extending inwardly from the ends of said shaft and being joined by slinging means positioned beneath said opening, said slinging means including paddle elements attached to said central shaft for movement in vertical planes for elevating material moved by said underlying conveyer to said grain drag floor.

5. A grain elevating mechanism comprising a horizontally extending rotatable shaft, a grain floor overlying said shaft and having an opening therethrough positioned over said mechanism, said mechanism including a plurality of radially extending disk segments mounted about said shaft with adjacent segments being equally spaced apart, each of the segments being provided with an arcuate outer surface bounded by leading and lagging surfaces, a longitudinally and radially extending slinger member attached along one radial side to a leading and lagging surface of adjacent segments, said slinger member having its other radial side turned up to provide a scoop for slinging grain upwardly through said opening.

References Cited in the file of this patent

UNITED STATES PATENTS

| | | |
|---|---|---|
| 887,024 | Anderson et al. | May 5, 1908 |
| 2,236,002 | Lederer | Mar. 25, 1941 |
| 2,382,965 | Appel | Aug. 21, 1945 |